United States Patent
Ohashi et al.

(10) Patent No.: US 12,134,322 B2
(45) Date of Patent: Nov. 5, 2024

(54) MOBILE OBJECT CONTROL DEVICE

(71) Applicant: EXEDY Corporation, Neyagawa (JP)

(72) Inventors: Yusuke Ohashi, Neyagawa (JP); Taichi Kitamura, Neyagawa (JP); Hitoshi Katsura, Neyagawa (JP)

(73) Assignee: EXEDY Corporation, Osaka (JP)

( * ) Notice: Subject to any disclaimer, the term of this patent is extended or adjusted under 35 U.S.C. 154(b) by 348 days.

(21) Appl. No.: 17/877,720

(22) Filed: Jul. 29, 2022

(65) Prior Publication Data
US 2023/0063733 A1    Mar. 2, 2023

(30) Foreign Application Priority Data

Aug. 30, 2021  (JP) .................................. 2021-140122
Jan. 31, 2022   (JP) .................................. 2022-012973

(51) Int. Cl.
*B60L 15/20*    (2006.01)

(52) U.S. Cl.
CPC .......... *B60L 15/2009* (2013.01); *B60L 15/20* (2013.01); *B60L 2200/42* (2013.01); *B60L 2240/12* (2013.01); *B60L 2240/14* (2013.01); *B60L 2240/642* (2013.01)

(58) Field of Classification Search
None
See application file for complete search history.

(56) References Cited

U.S. PATENT DOCUMENTS

2019/0291812 A1* 9/2019 Tsuchizawa ............. B62M 6/55
2020/0086877 A1* 3/2020 Zhang ................. B60W 50/038

FOREIGN PATENT DOCUMENTS

CN     108287076 A  *  7/2018  .......... G01M 17/007
JP     4495444 B2        7/2010

* cited by examiner

*Primary Examiner* — Tuan C To
*Assistant Examiner* — David Ruben Pedersen
(74) *Attorney, Agent, or Firm* — United IP Counselors, LLC

(57) ABSTRACT

A mobile object control device controls an electric motor assisting traveling of a mobile object. The mobile object control device includes a rolling resistance calculation section, a power loss calculation section, and an assist force calculation section. The rolling resistance calculation section calculates a rolling resistance based on a set weight set by a user. The power loss calculation section calculates a power loss caused until a power outputted from the electric motor is transmitted to a drive wheel. The assist force calculation section calculates an assist force of the electric motor based on an acceleration of the mobile object, the set weight, the rolling resistance calculated by the rolling resistance calculation section, the power loss calculated by the power loss calculation section, and an assist ratio.

23 Claims, 9 Drawing Sheets

MOBILE OBJECT CONTROL DEVICE

CROSS-REFERENCE TO RELATED APPLICATIONS

This application claims priority to Japanese Patent Applications Nos. 2021-140122 filed Aug. 30, 2021, and 2022-012973 filed Jan. 31, 2022. The entire contents of those applications are incorporated by reference herein in their entireties.

TECHNICAL FIELD

The present invention relates to a mobile object control device.

BACKGROUND ART

It has been proposed to enhance the performance of a mobile object moved at a low speed such as a pallet truck, a hand lift truck, a hand truck, or a wheelchair by attaching a drive unit thereto. The drive unit includes an electric motor for rotating and driving a wheel, a control device for controlling the electric motor, and so forth. When traveling of the mobile object is made by a human drive force, the electric motor outputs an assist force for assisting the human drive force.

For example, Publication of Japan Patent No. 4495444 discloses a control device that calculates the mass of a mobile object based on the acceleration of the mobile object or so forth and controls an assist force depending on the calculated mass.

When the assist force is controlled depending on the mass calculated as described above, it is concerned that a smooth assist motion cannot be realized due to impacts of noise and calculation error. In view of the above, it is an object of the present invention to realize a smooth assist motion.

BRIEF SUMMARY

A mobile object control device according to an aspect of the present invention controls an electric motor assisting traveling of a mobile object. The mobile object control device includes a rolling resistance calculation section, a power loss calculation section, and an assist force calculation section. The rolling resistance calculation section calculates a rolling resistance based on a set weight set by a user. The power loss calculation section calculates a power loss caused until a power outputted from the electric motor is transmitted to a drive wheel. The assist force calculation section calculates an assist force of the electric motor based on an acceleration of the mobile object, the set weight, the rolling resistance calculated by the rolling resistance calculation section, the power loss calculated by the power loss calculation section, and an assist ratio.

According to this configuration, the assist force calculation section calculates the assist force based on parameters with less calculation errors without calculating the weight; hence, a smooth assist motion can be realized.

Preferably, the mobile object control device further includes a drive force calculation section. The drive force calculation section calculates a drive force applied to the mobile object based on the acceleration of the mobile object, the set weight, the rolling resistance calculated by the rolling resistance calculation section, and the power loss calculated by the power loss calculation section. The assist force calculation section calculates the assist force of the electric motor based on the drive force calculated by the drive force calculation section and the assist ratio.

Preferably, the mobile object control device further includes a current control section calculating an electric current flowing through the electric motor based on the assist force.

Preferably, the power loss calculation section calculates a shaft viscosity resistance based on a vehicle velocity of the mobile object.

Preferably, the mobile object control device further includes a tilt angle detection section detecting a tilt angle of a road surface on which the mobile object travels. The rolling resistance calculation section corrects the rolling resistance based on the tilt angle detected by the tilt angle detection section. The drive force calculation section corrects the drive force based on the tilt angle detected by the tilt angle detection section.

Preferably, the rolling resistance calculation section corrects the rolling resistance when the vehicle velocity of the mobile object becomes a first threshold or greater.

Preferably, the power loss calculation section corrects the power loss when the vehicle velocity of the mobile object becomes a second threshold or greater.

Preferably, the mobile object control device further includes an assist force control section. The assist force control section sets the assist force to a preliminarily set value, while causing the assist force calculation section to stop calculating the assist force.

Preferably, the assist force control section sets the assist force to the preliminarily set value, while causing the assist force calculation section to stop calculating the assist force until the vehicle velocity of the mobile object reaches a preliminarily set value from starting of assist control.

Preferably, the assist force control section sets the assist force to the preliminarily set value, while causing the assist force calculation section to stop calculating the assist force until a preliminarily set time elapses from starting of assist control.

Preferably, the assist force control section sets the assist force to zero when the mobile object stands still after elapse of the preliminarily set time.

Preferably, the mobile object control device further includes an assist limit section executing at least either stopping an assist motion or actuating braking.

Preferably, the assist limit section executes at least either stopping the assist motion or actuating the braking when it is determined that the acceleration of the mobile object is a third threshold or greater.

Preferably, the assist limit section executes at least either stopping the assist motion or actuating the braking when it is determined that the vehicle velocity of the mobile object is a fourth threshold or greater.

Preferably, the assist force calculation section increases the assist force in accordance with an operation by the user.

Preferably, the assist force calculation section calculates an amount of increase of the assist force based on the set weight and a preliminarily set value of the tilt angle.

Preferably, the rolling resistance calculation section multiplies a first correction coefficient with respect to the rolling resistance so as to correct the rolling resistance when the vehicle velocity of the mobile object is less than a fifth threshold. On the other hand, the rolling resistance calculation section multiplies a second correction coefficient with respect to the rolling resistance so as to correct the rolling resistance when the vehicle velocity of the mobile object is greater than or equal to the fifth threshold and less than a sixth threshold. The second correction coefficient increases with increase in magnitude of the vehicle velocity. The second correction coefficient is greater in rate of change than the first correction coefficient.

Preferably, the rolling resistance calculation section multiplies a third correction coefficient with respect to the rolling resistance so as to correct the rolling resistance when the vehicle velocity of the mobile object is greater than or equal to the sixth threshold and less than a seventh threshold. The third correction coefficient is lesser in rate of change than the second correction coefficient.

Preferably, the rolling resistance calculation section multiplies a fourth correction coefficient with respect to the rolling resistance so as to correct the rolling resistance when the vehicle velocity of the mobile object is greater than or equal to the seventh threshold and less than an eighth threshold. The fourth correction coefficient decreases with increase in magnitude of the vehicle velocity.

Preferably, the rolling resistance calculation section multiplies a fifth correction coefficient with respect to the rolling resistance so as to correct the rolling resistance when the vehicle velocity of the mobile object is the eighth threshold or greater. The fifth correction coefficient is lesser in rate of change than the fourth correction coefficient.

Preferably, the power loss calculation section multiplies a sixth correction coefficient with respect to the shaft viscosity resistance so as to correct the power loss when the vehicle velocity of the mobile object is less than a ninth threshold. On the other hand, the power loss calculation section multiplies a seventh correction coefficient with respect to the shaft viscosity resistance so as to correct the power loss when the vehicle velocity of the mobile object is greater than or equal to the ninth threshold and less than a tenth threshold. The seventh correction coefficient increases with increase in magnitude of the vehicle velocity. The seventh correction coefficient is greater in rate of change than the sixth correction coefficient.

Preferably, the power loss calculation section multiplies an eighth correction coefficient with respect to the shaft viscosity resistance so as to correct the power loss when the vehicle velocity of the mobile object is greater than or equal to the tenth threshold and less than an eleventh threshold. The eighth correction coefficient is lesser in rate of change than the seventh correction coefficient.

Preferably, the power loss calculation section multiplies a ninth correction coefficient with respect to the shaft viscosity resistance so as to correct the power loss when the vehicle velocity of the mobile object is greater than or equal to the eleventh threshold and less than a twelfth threshold. The ninth correction coefficient decreases with increase in magnitude of the vehicle velocity.

Preferably, the power loss calculation section multiplies a tenth correction coefficient with respect to the shaft viscosity resistance so as to correct the power loss when the vehicle velocity of the mobile object is the twelfth threshold or greater. The tenth correction coefficient is lesser in rate of change than the ninth correction coefficient.

Overall, according to the present invention, a smooth assist motion can be realized.

DETAILED DESCRIPTION

A mobile object control device according to the present preferred embodiment will be hereinafter explained with reference to drawings. The mobile object control device (hereinafter simply referred to as "control device" on an as-needed basis) is configured to control an electric motor for assisting traveling of a mobile object. The control device is installed in the mobile object. It should be noted that traveling of the mobile object is made by a human drive force. The mobile object is moved at a low speed. The mobile object is configured to transport an object. It should be noted that the term "object" is conceptualized as encompassing a person or so forth as well. A pallet truck, a hand lift truck, a hand truck, a wheelchair, or so forth is exemplified as the mobile object described above. It should be noted that in the present preferred embodiment, the mobile object is the pallet truck.

<Pallet Truck>

Figure 1:
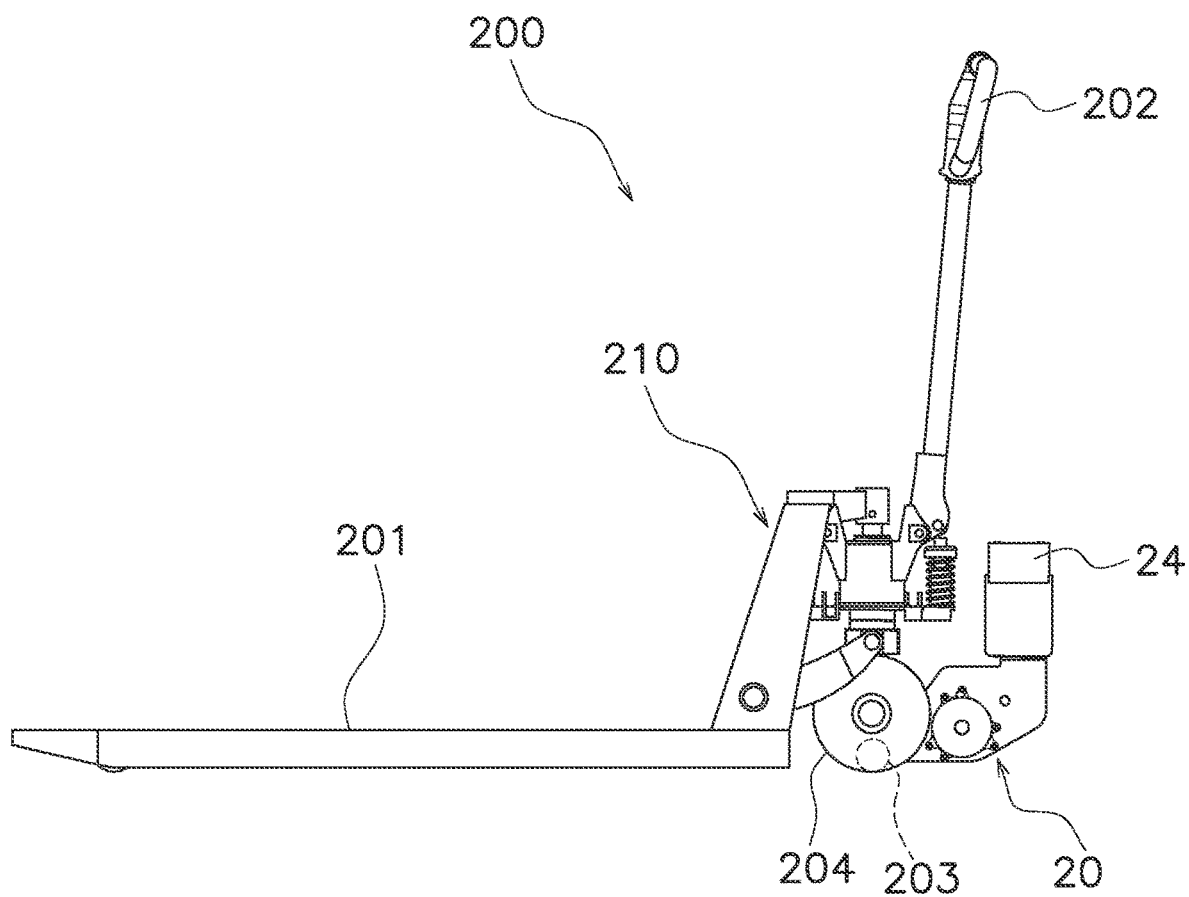
FIG. 1 is a side view of a pallet truck.

FIG. 1 is a side view of a pallet truck 200 in which the control device is installed. As shown in FIG. 1, the pallet truck 200 includes a pallet truck body 210 and a drive unit 20. The pallet truck body 210 includes a loading platform (a pair of fork arms) 201, an operating handle 202, and a plurality of vehicle wheels 204. It should be noted that each vehicle wheel 204 is a non-drive wheel. The drive unit 20 is attached to the pallet truck body 210.

<Drive Unit>

Figure 2:
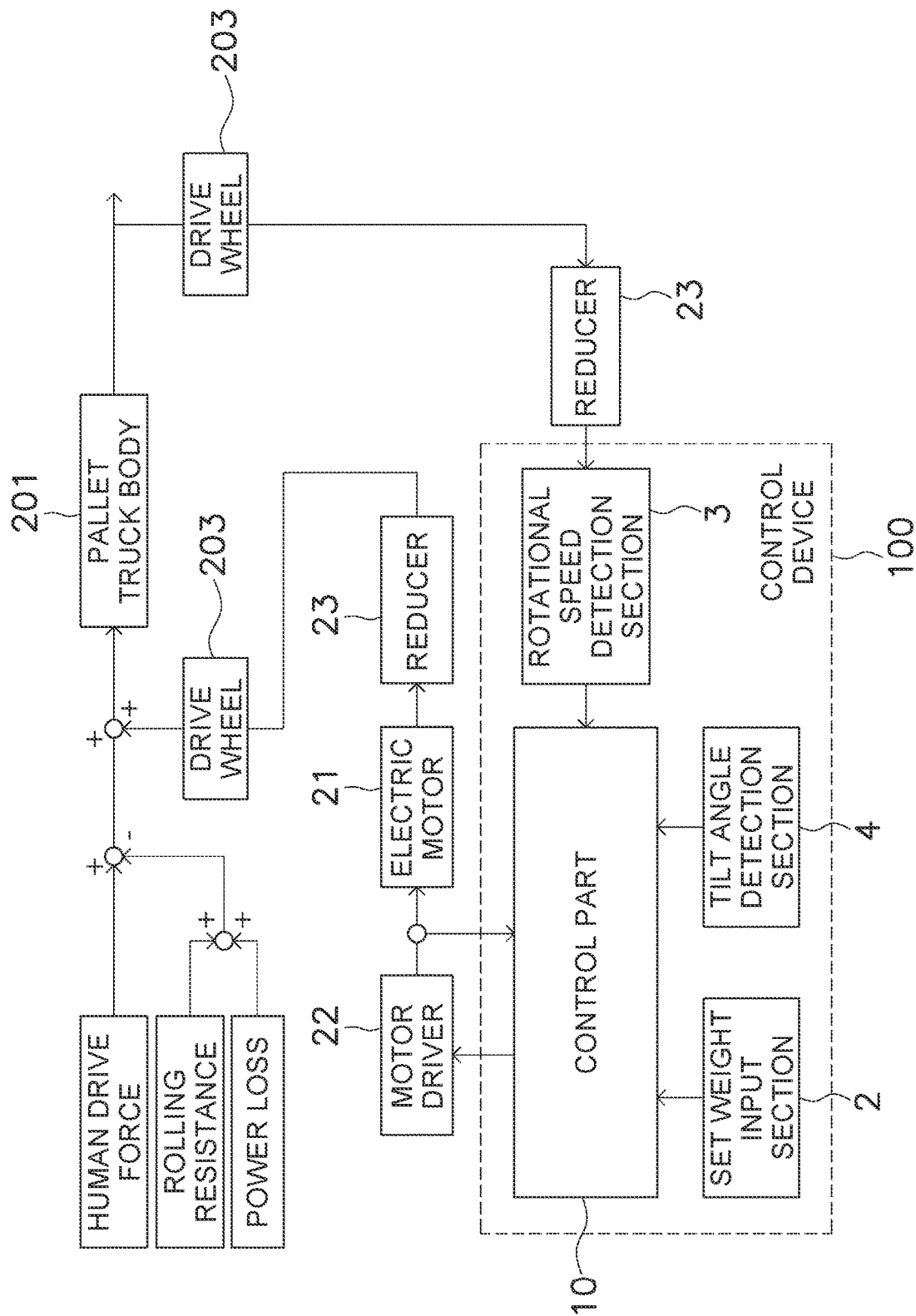
FIG. 2 is a block diagram of a drive unit.

As shown in FIG. 2, the drive unit 20 includes an electric motor 21, a motor driver 22, a reducer 23, a battery 24 (see FIG. 1), a drive wheel 203, and a control device 100. It should be noted that the drive unit 20 may not include the drive wheel 203. In this case, the drive unit 20 rotates and drives at least one of the vehicle wheels 204 of the pallet truck 200 instead of the drive wheel 203.

When traveling of the pallet truck 200 is made by a human drive force of a user, the electric motor 21 outputs an assist force for assisting traveling of the pallet truck 200. The electric motor 21 rotates and drives the drive wheel 203.

The motor driver 22 controls electricity to be supplied to the electric motor 21 from the battery 24. The motor driver 22 is connected to the control device 100 by wired or wireless means in communicable manner. The motor driver 22 drives the electric motor 21 in accordance with a control signal inputted thereto from the control device 100.

The reducer 23 reduces the speed of rotation of the electric motor 21 and transmits the rotation reduced in speed to the drive wheel 203. The reducer 23 is composed of, for instance, a plurality of gears and so forth.

<Control Device>

The control device 100 includes a set weight input section 2, a rotational speed detection section 3, a tilt angle detection section 4, and a control part 10.

The set weight input section 2 is configured to receive input of a set weight, i.e., a weight set by the user. For example, the set weight input section 2 includes a plurality of options preliminarily set as values of the set weight. The set weight input section 2 enables the user to select the most suitable value of the set weight.

For example, a rotary switch and/or so forth can be provided as the set weight input section 2. The set weight input section 2 is attached to, for instance, the operating handle 202. It should be noted that a touch screen and/or so forth can be provided as the set weight input section 2 to receive input of an arbitrary value as the set weight.

The term "set weight" refers to the total weight of the pallet truck 200 and a transported object, but alternatively, can refer to only the weight of the transported object. In assumption of only the weight of the transported object, the control part 10 adds the weight of the pallet truck 200 to the set weight when performing various computations.

The rotational speed detection section 3 is configured to detect the rotational speed of the electric motor 21. For example, a hall sensor, attached to the interior of the electric motor 21, can be provided as the rotational speed detection section 3.

The tilt angle detection section 4 detects the tilt angle of the road surface on which the pallet truck 200 travels. It should be noted that a tilt sensor, for instance, can be provided as the tilt angle detection section 4. Alternatively, an acceleration sensor, a gyro sensor, or so forth can be provided as the tilt angle detection section 4.

For example, a computer (e.g., microcomputer), including a CPU (Central Processing Unit), a ROM (Read Only Memory), and so forth, is provided as the control part 10. The ROM stores programs for various computations. The CPU executes the programs stored in the ROM.

Figure 3:
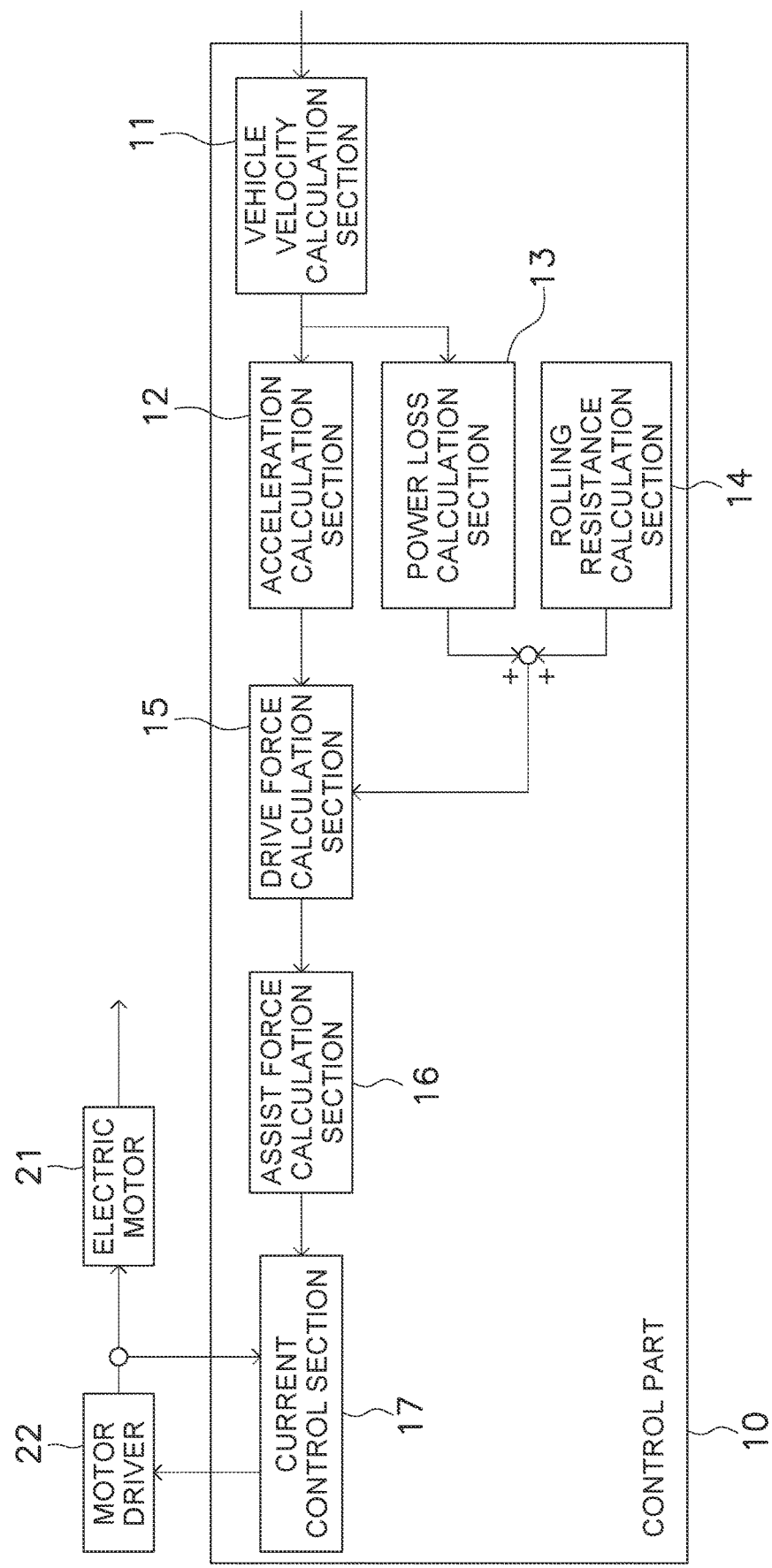
FIG. 3 is a block diagram of a control part.

As shown in FIG. 3, the control part 10 includes a vehicle velocity calculation section 11, an acceleration calculation section 12, a power loss calculation section 13, a rolling resistance calculation section 14, a drive force calculation section 15, an assist force calculation section 16, and a current control section 17.

The vehicle velocity calculation section 11 calculates vehicle velocity of the pallet truck 200 based on the rotational speed (N) of the electric motor 21 detected by the rotational speed detection section 3, reduction ratio (i) of the reducer 23, and wheel radius (R) of the drive wheel 203. Specifically, the vehicle velocity calculation section 11 calculates the vehicle velocity (V) based on the following formula (1). It should be noted that the reduction ratio i and the wheel radius R are preliminarily stored in the control part 10 but can be rewritten on an arbitrary basis.

[Math. 1]

$$V(t) = \frac{2\pi R N(t)}{i} \quad (1)$$

The acceleration calculation section 12 calculates acceleration of the pallet truck 200 by calculating differential (also referred to as "exact differential") of the vehicle velocity V calculated by the vehicle velocity calculation section 11. Specifically, the acceleration calculation section 12 calculates the acceleration (a) based on the following formula (2). It should be noted that "t" indicates time in the following formula. The following formula is described on a time domain basis.

[Math. 2]

$$a(t) = \frac{dV(t)}{dt} \quad (2)$$

It should be noted that the acceleration calculation section 12 can calculate the acceleration a by calculating pseudo differential (also referred to as "inexact differential") of the vehicle velocity V as expressed by the following formula (3). It should be noted that the following formula is described on a frequency domain basis.

[Math. 3]

$$a(s) = \frac{T_D \cdot s}{1 + \eta T_D \cdot s} V(s) \quad (3)$$

It should be noted that "s" indicates Laplace operator; "TD" indicates differential time; "$_i$" indicates differential coefficient.

The acceleration calculation section 12 can include at least either an upper limiter or a lower limiter. With the upper limiter, an excessive assist motion can be prevented from being performed for rapid acceleration. By contrast, with the lower limiter, an assist force can be prevented from being underestimated due to noise or minus (negative) acceleration calculated in getting over a step.

The power loss calculation section 13 calculates power loss caused until the power outputted from the electric motor 21 is transmitted to the drive wheel 203. The power loss calculation section 13 calculates the power loss ($F_v$) based on, for instance, the following formula (4).

[Math. 4]

$$F_v = kV + C \quad (4)$$

It should be noted that "kV" indicates shaft viscosity resistance; "k" indicates shaft viscosity coefficient. The power loss calculation section 13 calculates the shaft viscosity resistance kV based on the vehicle velocity V calculated by the vehicle velocity calculation section 11. It should be noted that the shaft viscosity coefficient k is preliminarily stored in the control part 10 but can be rewritten on an arbitrary basis. Besides, "C" indicates power loss excluding the shaft viscosity resistance and is, for instance, the sum of power loss including transmission loss of a chain or so forth, bearing friction, and so forth. The power loss C excluding the shaft viscosity resistance is also preliminarily stored in the control part 10 but can be rewritten on an arbitrary basis. It should be noted that the power loss calculation section 13 can calculate only the shaft viscosity resistance kV, where C is set to 0.

The rolling resistance calculation section 14 calculates rolling resistance based on the set weight (M) inputted to the set weight input section 2. Besides, the rolling resistance calculation section 14 corrects the rolling resistance ($F_r$) based on the tilt angle (θ) detected by the tilt angle detection section 4. Specifically, the rolling resistance calculation section 14 calculates the rolling resistance $F_r$ based on the following formula (5).

[Math. 5]

$$F_r = C_{rr} M g \cos \theta \quad (5)$$

It should be noted that "$C_{rr}$" indicates rolling resistance coefficient; "g" indicates gravitational acceleration. The rolling resistance coefficient $C_{rr}$ and the gravitational acceleration g are preliminarily stored in the control part 10 but can be rewritten on an arbitrary basis.

The drive force calculation section 15 calculates a drive force applied to the pallet truck 200 based on the acceleration a calculated by the acceleration calculation section 12, the set weight M inputted to the set weight input section 2, the rolling resistance $F_r$ calculated by the rolling resistance calculation section 14, and the power loss $F_v$ calculated by the power loss calculation section 13. Besides, the drive force calculation section 15 corrects the drive force based on the tilt angle θ detected by the tilt angle detection section 4. When described in detail, Mg sign θ is added thereto as expressed in the following formula (6). It should be noted that the drive force applied to the pallet truck 200 is the sum of the human drive force of the user and the assist force outputted from the electric motor 21.

When described in detail, the drive force calculation section 15 calculates the drive force (F) based on the following formula (6).

[Math. 6]

$$F = Ma + F_v + F_r + Mg \sin\theta \tag{6}$$

It should be noted that the drive force calculation section 15 can calculate the drive force F with the vehicle velocity V calculated by the vehicle velocity calculation section 11 instead of the acceleration a calculated by the acceleration calculation section 12. When described in detail, the drive force calculation section 15 can calculate the drive force F based on the following formula (7).

[Math. 7]

$$F = M\frac{dV}{dt} + F_v + F_r + Mg\sin\theta \tag{7}$$

The assist force calculation section 16 calculates an assist force based on the acceleration a calculated by the acceleration calculation section 12, the set weight M inputted to the set weight input section 2, the rolling resistance $F_r$ calculated by the rolling resistance calculation section 14, the power loss R calculated by the power loss calculation section 13, and an assist ratio α.

It should be noted that in the present preferred embodiment, the drive force calculation section 15 calculates the drive force F based on the acceleration a, the set weight M, the rolling resistance $F_r$, and the power loss $F_v$; then, the assist force calculation section 16 calculates the assist force with the drive force F. Specifically, the assist force calculation section 16 calculates the assist force outputted from the electric motor 21 based on the drive force F calculated by the drive force calculation section 15 and the assist ratio α. When described in detail, the assist force calculation section 16 calculates the assist force ($F_a$) based on the following formula (8).

[Math. 8]

$$F_a = \alpha F \tag{8}$$

It should be noted that the assist ratio α is greater than 0 and less than 1. The assist ratio α is preliminarily stored in the control part 10 but can be rewritten on an arbitrary basis.

The current control section 17 calculates electric current flowing through the electric motor 21 based on the wheel radius R of the drive wheel 203, the reduction ratio i of the reducer 23, a motor torque constant ($K_t$), and the assist force $F_a$ calculated by the assist force calculation section 16. The current control section 17 outputs a control signal to the motor driver 22 such that the electric current herein calculated flows through the electric motor 21. It should be noted that the current control section 17 calculates motor current ($i_{mref}$) based on the following formula (9).

[Math. 9]

$$i_{mref} = \frac{R}{iK_t}F_a \tag{9}$$

It should be noted that as expressed in the following formula (10), the motor torque constant $K_t$ is a constant through which an output torque ($T_m$) of the electric motor 21 and motor current ($i_m$) are associated.

[Math. 10]

$$T_m = K_t i_m \tag{10}$$

Besides, the current control section 17 not only calculates the motor current $i_{mref}$ but also performs feedback control based on comparison between the calculated motor current and motor current actually flowing through the electric motor 21, and furthermore, outputs a control signal (e.g., duty cycle) to the motor driver 22.

<Actions of Controller>

Figure 4:
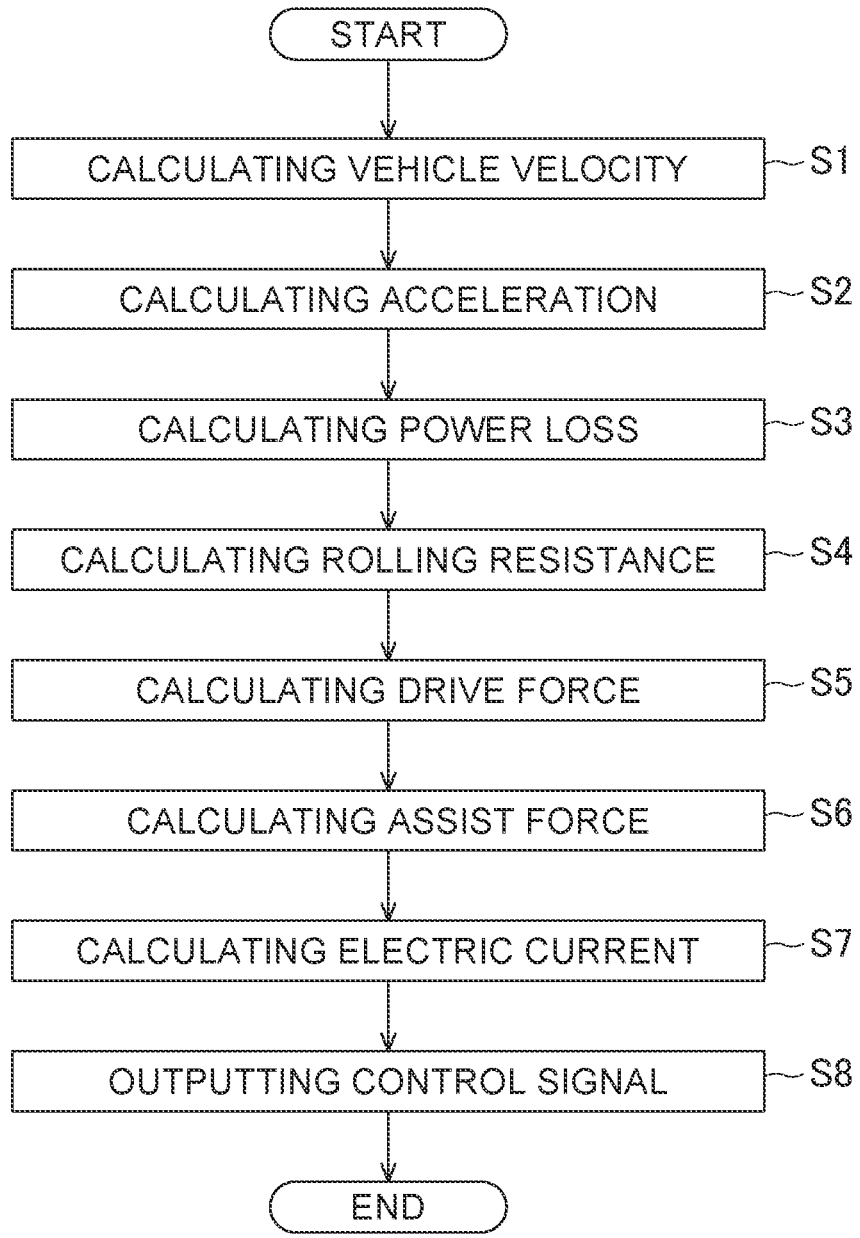
FIG. 4 is a flowchart showing a series of actions executed by the control part.

Next, an example of a series of processing executed by the control part 10 with reference to a flowchart shown in FIG. 4.

First, the vehicle velocity calculation section 11 calculates vehicle velocity of the pallet truck 200 (step S1).

Next, the acceleration calculation section 12 calculates acceleration of the pallet truck 200 based on the calculated vehicle velocity (step S2). Then, the power loss calculation section 13 calculates power loss caused until an assist force outputted from the electric motor 21 is transmitted to the drive wheel 203 based on the calculated vehicle velocity (step S3). It should be noted that the processing steps S2 and S3 can be reversed in sequence.

The rolling resistance calculation section 14 calculates rolling resistance generated between the drive wheel 203 and the road surface when the pallet truck 200 travels (step S4). It should be noted that the processing step S4 can be executed prior to any of the processing steps S1 to S3.

Next, the drive force calculation section 15 calculates a drive force (F) applied to the pallet truck 200 based on the acceleration (a) calculated by the acceleration calculation section 12, set weight (M) inputted to the set weight input section 2, the rolling resistance ($F_r$) calculated by the rolling resistance calculation section 14, and the power loss ($F_v$) calculated by the power loss calculation section 13 (step S5).

Next, the assist force calculation section 16 calculates an assist force ($F_a$) outputted from the electric motor 21 based on the drive force F calculated by the drive force calculation section 15 and an assist ratio (α) (step S6).

Next, the current control section 17 calculates electric current flowing through the electric motor 21 based on the wheel radius (R) of the drive wheel 203, the reduction ratio (i) of the reducer 23, a motor torque constant (Kr), and the assist force $F_a$ calculated by the assist force calculation section 16 (step S7). Then, the current control section 17 outputs a control signal to the motor driver 22 such that the calculated electric current flows through the electric motor 21 (step S8).

Based on the above, the electric motor 21 outputs the assist force calculated by the assist force calculation section 16 to rotate and drive the drive wheel 203.

[Modifications]

One preferred embodiment of the present invention has been explained above. However, the present invention is not limited to the above, and a variety of changes can be made without departing from the gist of the present invention. Modifications to be described are simultaneously applicable to each other.

(a) In the preferred embodiment described above, the control device 100 includes the vehicle velocity calculation section 11. However, the control device 100 may not include the vehicle velocity calculation section 11. For example, the control device 100 can include a vehicle velocity sensor instead of the vehicle velocity calculation section 11.

(b) In the preferred embodiment described above, the control device 100 includes the acceleration calculation section 12. However, the control device 100 may not include the acceleration calculation section 12. For example, the control device 100 can include an acceleration sensor instead of the acceleration calculation section 12.

Figure 5:
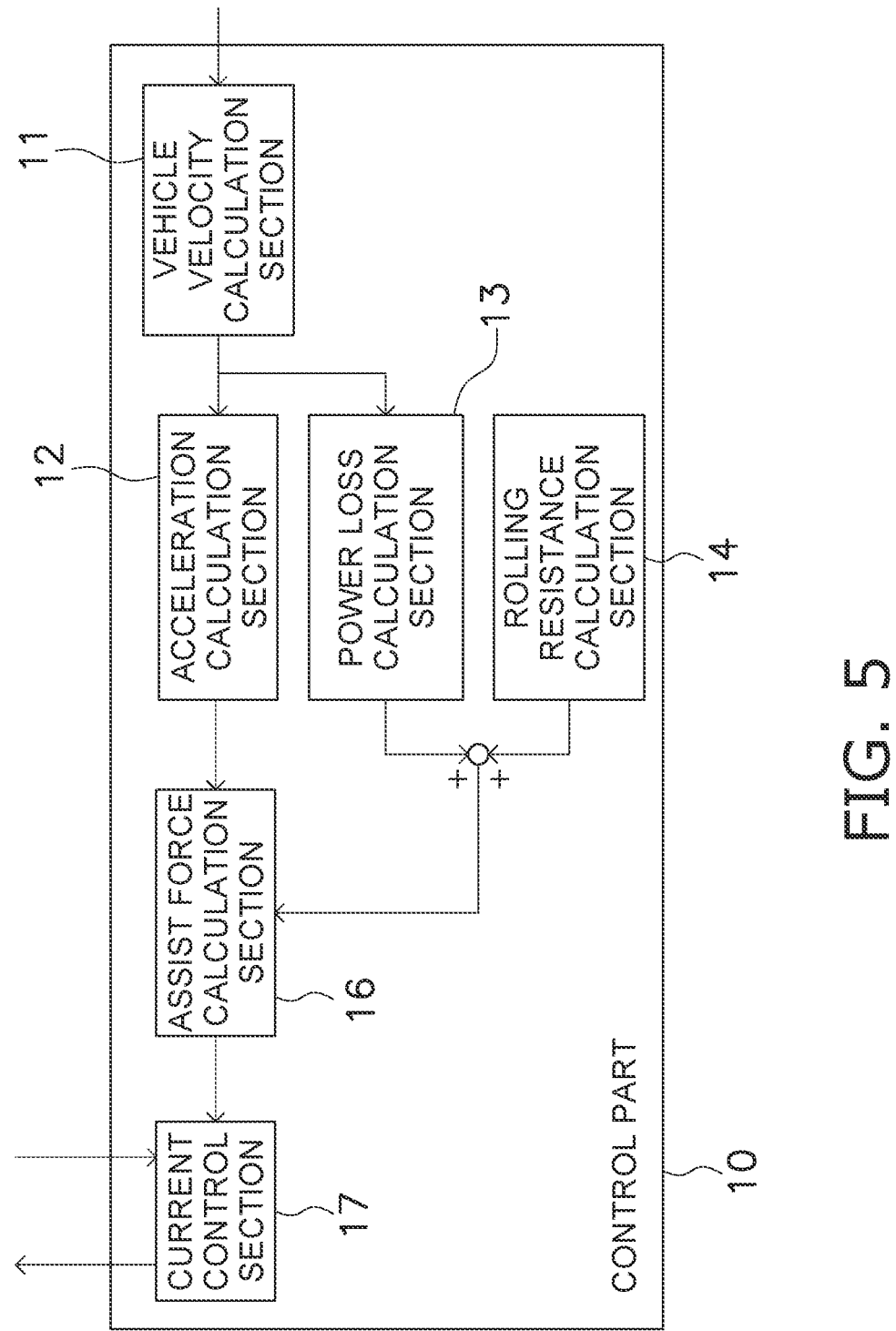
FIG. 5 is a block diagram of a control part according to a modification.

(c) In the preferred embodiment described above, the control device 100 includes the drive force calculation section 15. However, the configuration of the control device 100 is not limited to this. For example, as shown in FIG. 5, the control device 100 may not include the drive force calculation section 15.

In this case, the assist force calculation section 16 calculates an assist force based on the acceleration a calculated by the acceleration calculation section 12, the set weight M inputted to the set weight input section 2, the rolling resistance $F_r$ calculated by the rolling resistance calculation section 14, the power loss $F_v$ calculated by the power loss calculation section 13, and the assist ratio $\alpha$.

When described in detail, the assist force calculation section 16 calculates the assist force ($F_a$) based on the following formula (11).

[Math. 11]

$$F_\alpha = \alpha M a + F_v + F_r + Mg \sin\theta \tag{11}$$

(d) In the preferred embodiment described above, the control device 100 includes the tilt angle detection section 4. However, the configuration of the control device 100 is not limited to this. For example, when in use in a place with a flat road surface such as the interior of a factory building, the control device 100 may not include the tilt angle detection section 4.

In this case, the rolling resistance calculation section 14 does not execute correction of the rolling resistance based on the tilt angle $\theta$. In other words, the rolling resistance calculation section 14 corrects the rolling resistance based on the tilt angle $\theta$ in the preferred embodiment described above but does not correct the rolling resistance in the present modification. In this case, the rolling resistance calculation section 14 calculates the rolling resistance, where the tilt angle $\theta$ is set to 0 in the formula (5) described above.

Moreover, the drive force calculation section 15 corrects the drive force based on the tilt angle $\theta$ in the preferred embodiment described above but does not execute correction of the drive force based on the tilt angle $\theta$ in the present modification. In other words, the drive force calculation section 15 calculates the drive force, where the tilt angle $\theta$ is set to 0 in the formula (6) described above.

(e) The rolling resistance calculation section 14 can correct the rolling resistance $F_r$ when the vehicle velocity of the pallet truck 200 becomes a first threshold or greater. When described in detail, the rolling resistance calculation section 14 can calculate the rolling resistance $F_r$ based on the following formula (12).

[Math. 12]

$$F_r = \gamma C_{rr} Mg \cos\theta \tag{12}$$

It should be noted that "$\gamma$" indicates rolling resistance correction coefficient that is 1 or less.

As described above, impact of inertia can be absorbed with correction of the rolling resistance $F_r$ executed by the rolling resistance calculation section 14.

(f) The power loss calculation section 13 can correct the power loss when the vehicle velocity of the pallet truck 200 becomes a second threshold or greater. When described in detail, the power loss calculation section 13 can correct the shaft viscosity resistance. It should be noted that the second threshold can be a value equal to or different from the first threshold. The power loss calculation section 13 can calculate the power loss $F_v$ based on the following formula (13).

[Math. 13]

$$F_v = \beta k V + C \tag{13}$$

It should be noted that "$\beta$" indicates shaft viscosity resistance correction coefficient that is 1 or less.

As described above, impact of inertia can be absorbed with correction of the power loss $F_v$ executed by the power loss calculation section 13.

Figure 6:
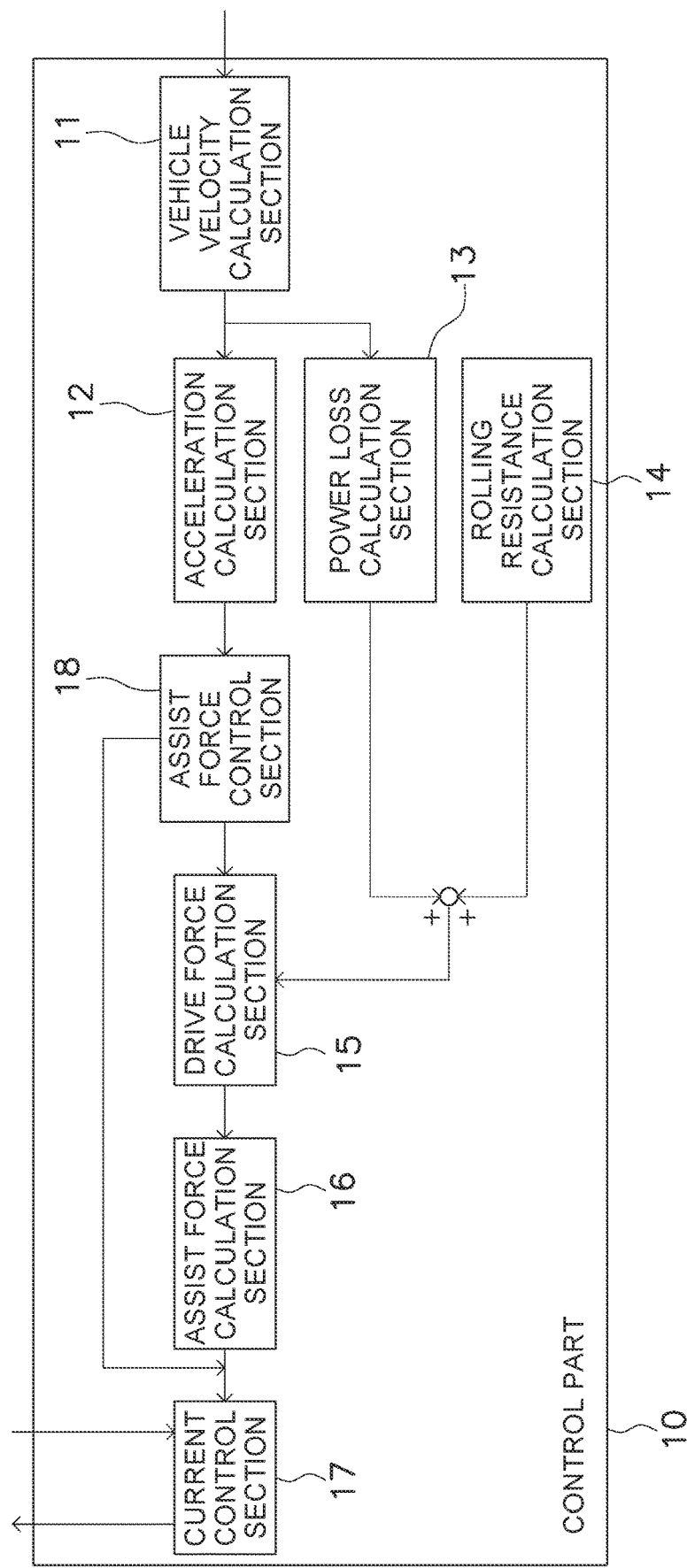
FIG. 6 is a block diagram of a control part according to another modification.

(g) As shown in FIG. 6, the control device 100 can further include an assist force control section 18. The assist force control section 18 causes the assist force calculation section 16 to stop calculating the assist force until the pallet truck 200 reaches a preliminarily set vehicle velocity from starting of the assist control. Instead of stopping calculation of the assist force, the assist force control section 18 sets the assist force to a preliminarily set value. In this case, the current control section 17 calculates electric current such that the assist force having the preliminarily set value can be obtained. It should be noted that the preliminarily set value may not be a fixed value.

For example, whether or not the assist control has been started can be determined as follows. A switch is mounted to the operating handle or so forth so as to be operated for outputting the assist force. Then, when the switch is turned on, it is determined that the assist control has been started.

(h) In the modification described above, the assist force control section 18 controls the assist force based on the vehicle velocity. However, the assist force control section 18 can control the assist force based on an elapsed time. When described in detail, the assist force control section 18 causes the assist force calculation section 16 to stop calculating the assist force until a preliminarily set time elapses from starting of the assist control. Instead of stopping calculation of the assist force, the assist force control section 18 sets the assist force to a preliminarily set value.

It should be noted that the assist force control section 18 can set the assist force to 0 when determining that the pallet truck 200 stands still even after elapse of the preliminarily set time. Alternatively, the assist force control section 18 can control the assist force based on both the vehicle velocity and the elapsed time.

Figure 7:
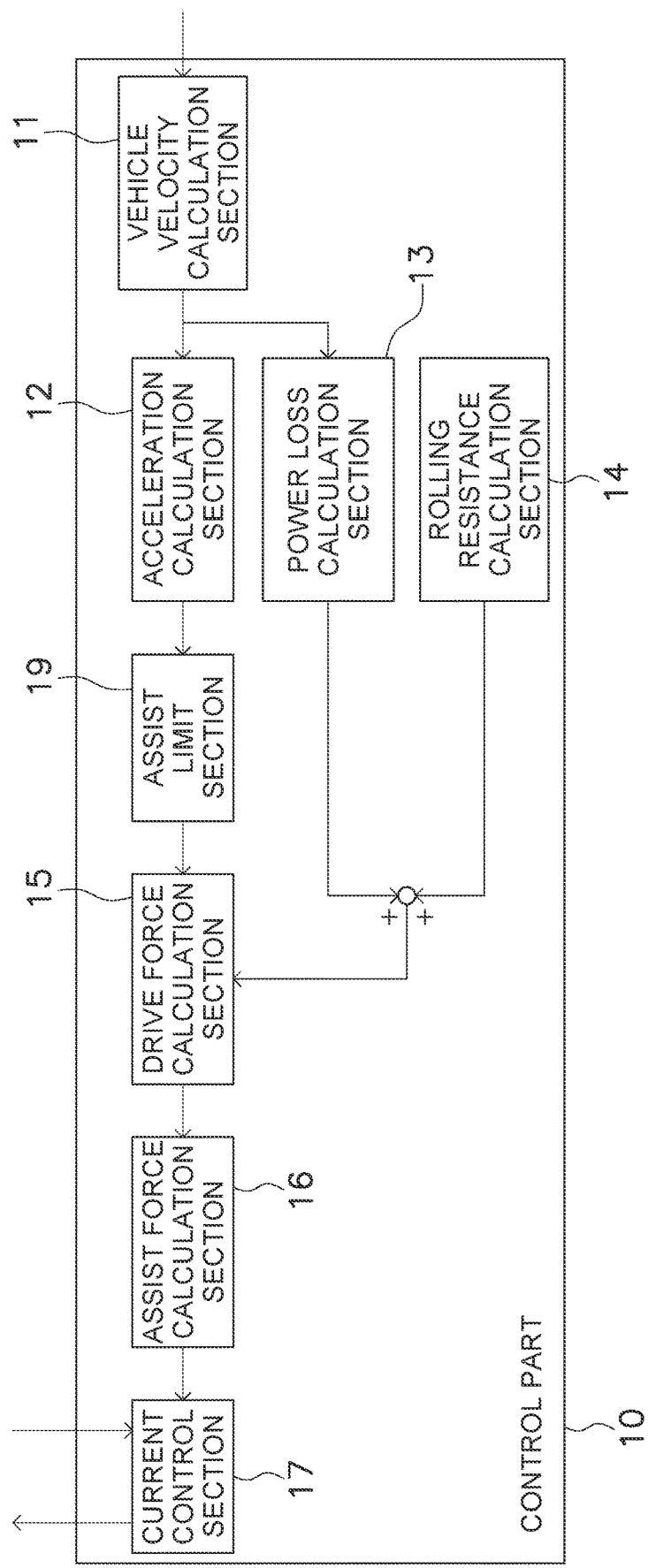
FIG. 7 is a block diagram of a control part according to yet another modification.

(i) As shown in FIG. 7, the control device 100 can further include an assist limit section 19. The assist limit section 19 determines whether or not the acceleration of the pallet truck 200 is a third threshold or greater. When determining that the acceleration of the pallet truck 200 is the third threshold or greater, the assist limit section 19 causes the electric motor 21 to stop performing the assist motion until the vehicle velocity of the pallet truck 200 reaches a preliminarily set value or less. It should be noted that the assist limit section 19 can actuate braking instead of stopping the assist motion. It should be noted that braking can be, for instance, regenerative braking or short braking by the electric motor 21.

(j) In the modification described above, the assist limit section 19 is configured to stop the assist motion or actuate braking based on the acceleration of the pallet truck 200. However, the assist limit section 19 can stop the assist motion or actuate braking based on the vehicle velocity of the pallet truck 200. Specifically, the assist limit section 19 determines whether or not the vehicle velocity of the pallet truck 200 is a fourth threshold or greater. When determining that the vehicle velocity of the pallet truck 200 is the fourth threshold or greater, the assist limit section 19 at least either stops the assist motion or actuates braking. It should be noted that the assist limit section 19 can stop the assist motion and/or actuate braking based on both the acceleration and the vehicle velocity of the pallet truck 200.

(k) The assist force calculation section 16 can be configured to increase the assist force in accordance with the operation by the user. For example, the control device 100 includes a boost input part. For example, a push button and/or so forth can be provided as the boost input part. The boost input part is attached to, for instance, the operating handle 202. When the user operates (e.g., pushes) the boost input part, the assist force calculation section 16 increases the assist force. For example, the assist force calculation section 16 calculates the amount of increase in assist force based on the set weight described above and a preliminarily set tilt angle.

The assist force calculation section 16 calculates the assist force $F_a$ based on, for instance, the following formula (14) or (15). The assist force calculation section 16 determines whether or not the boost input part has been operated. When determining that the boost input part has not been operated yet, the assist force calculation section 16 calculates the assist force $F_a$, where θ is set to 0 in the following formula (14) or (15). In other words, the assist force calculation section 16 does not increase the assist force. Contrarily, when determining that the boost input part has been operated, the assist force calculation section 16 calculates the assist force $F_a$, where θ is set to a value greater than 0 in the following formula (14) or (15). For example, the assist force calculation section 16 calculates the assist force $F_a$, where θ is set to a value from 0.1 to 5 in the following formula (14) or (15). In this way, the assist force calculation section 16 increases the assist force.

[Math. 14]

$$F_a = \alpha(Ma + F_v + F_r + Mg \sin \theta) \quad (14)$$

[Math. 15]

$$F_a = \alpha Ma + F_v + F_r + Mg \sin \theta \quad (15)$$

It should be noted that in the present modification, the control device 100 does not include the tilt angle detection section 4, but alternatively, can include the tilt angle detection section 4.

(l) The rolling resistance calculation section 14 can correct the rolling resistance by the rolling resistance correction coefficient γ. Unlike in the modification (e), the rolling resistance calculation section 14 changes the rolling resistance correction coefficient γ depending on the vehicle velocity in the present modification.

Figure 8:
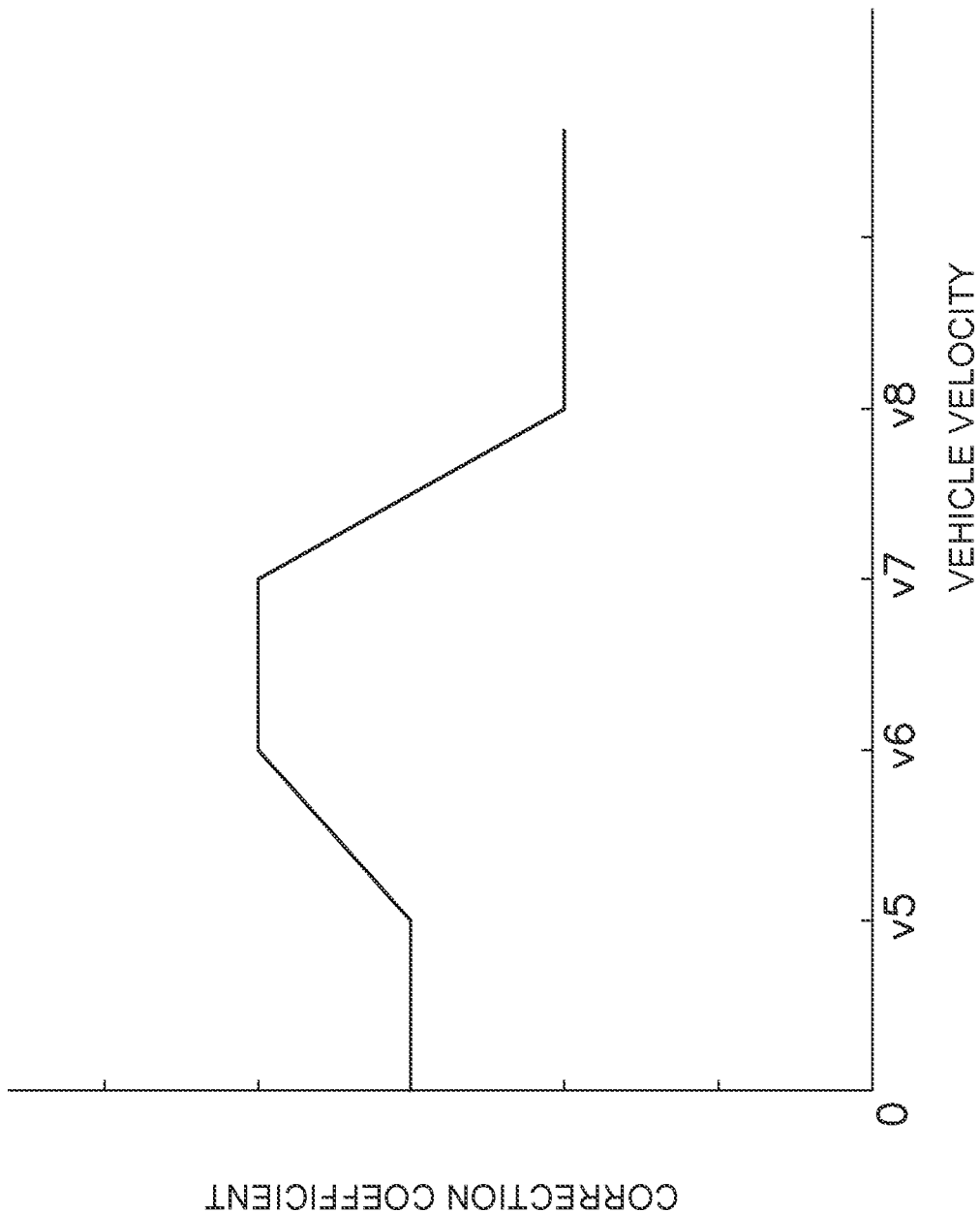
FIG. 8 is a chart showing a relation between vehicle velocity and rolling resistance correction coefficient.

Speaking in detail, as shown in FIG. 8, when the vehicle velocity of the pallet truck 200 is less than a fifth threshold v5, the rolling resistance calculation section 14 multiplies a first correction coefficient γ1 with respect to the rolling resistance $F_r$ calculated in the formula (5) described above so as to correct the rolling resistance $F_r$. It is preferable to set the first correction coefficient γ1 as a fixed value not changing depending on the vehicle velocity. It should be noted that the first correction coefficient γ1 can increase or decrease depending on the vehicle velocity. Besides, the first correction coefficient γ1 is, for instance, less than 1.

When the vehicle velocity of the pallet truck 200 is greater than or equal to the fifth threshold v5 and is less than a sixth threshold v6, the rolling resistance calculation section 14 multiplies a second correction coefficient γ2 with respect to the rolling resistance $F_r$ calculated based on the formula (5) described above so as to correct the rolling resistance $F_r$. The second correction coefficient γ2 increases with increase in vehicle velocity. The second correction coefficient γ2 is greater in rate of change (rate of increase) than the first correction coefficient γ1. It should be noted that the second correction coefficient γ2 is, for instance, 1 or less.

When the vehicle velocity of the pallet truck 200 is greater than or equal to the sixth threshold v6 and less than a seventh threshold v7, the rolling resistance calculation section 14 multiplies a third correction coefficient γ3 with respect to the rolling resistance $F_r$ calculated based on the formula (5) described above so as to correct the rolling resistance $F_r$. It is preferable to set the third correction coefficient γ3 as a fixed value not changing depending on the vehicle velocity. The third correction coefficient γ3 is greater in magnitude than the first correction coefficient γ1. Besides, the third correction coefficient γ3 can be set to be equal to the maximum value of the second correction coefficient γ2. The third correction coefficient γ3 can be set to, for instance, 1. It should be noted that the third correction coefficient γ3 can increase or decrease depending on the vehicle velocity. In this case, the third correction coefficient γ3 is lesser in rate of change than the second correction coefficient γ2.

When the vehicle velocity of the pallet truck 200 is greater than or equal to the seventh threshold v7 and less than an eighth threshold v8, the rolling resistance calculation section 14 multiplies a fourth correction coefficient γ4 with respect to the rolling resistance $F_r$ calculated based on the formula (5) described above so as to correct the rolling resistance $F_r$. The fourth correction coefficient γ4 decreases with increase in vehicle velocity. The fourth correction coefficient γ4 is greater in rate of change (rate of decrease) than the third correction coefficient γ3. It should be noted that the fourth correction coefficient γ4 is, for instance, 1 or less.

When the vehicle velocity of the pallet truck 200 is greater than or equal to the eighth threshold v8, the rolling resistance calculation section 14 multiplies a fifth correction coefficient γ5 with respect to the rolling resistance $F_r$ calculated based on the formula (5) described above so as to correct the rolling resistance $F_r$. It is preferable to set the fifth correction coefficient γ5 as a fixed value not changing depending on the vehicle velocity. The fifth correction coefficient γ5 is lesser in magnitude than the third correction coefficient γ3. Besides, the fifth correction coefficient γ5 can be equal in magnitude to, greater in magnitude than, or lesser in magnitude than the first correction coefficient γ1. The fifth correction coefficient γ5 can be set to be equal to the minimum value of the fourth correction coefficient γ4. The fifth correction coefficient γ5 can be set to, for instance, less than 1. It should be noted that the fifth correction coefficient γ5 can increase or decrease depending on the vehicle velocity. In this case, the fifth correction coefficient γ5 is lesser in rate of change than the fourth correction coefficient γ4.

(m) The power loss calculation section 13 can correct the shaft viscosity resistance by the shaft viscosity resistance correction coefficient β. Unlike in the modification (f), the power loss calculation section 13 changes the shaft viscosity resistance correction coefficient β depending on the vehicle velocity in the present modification.

Figure 9:
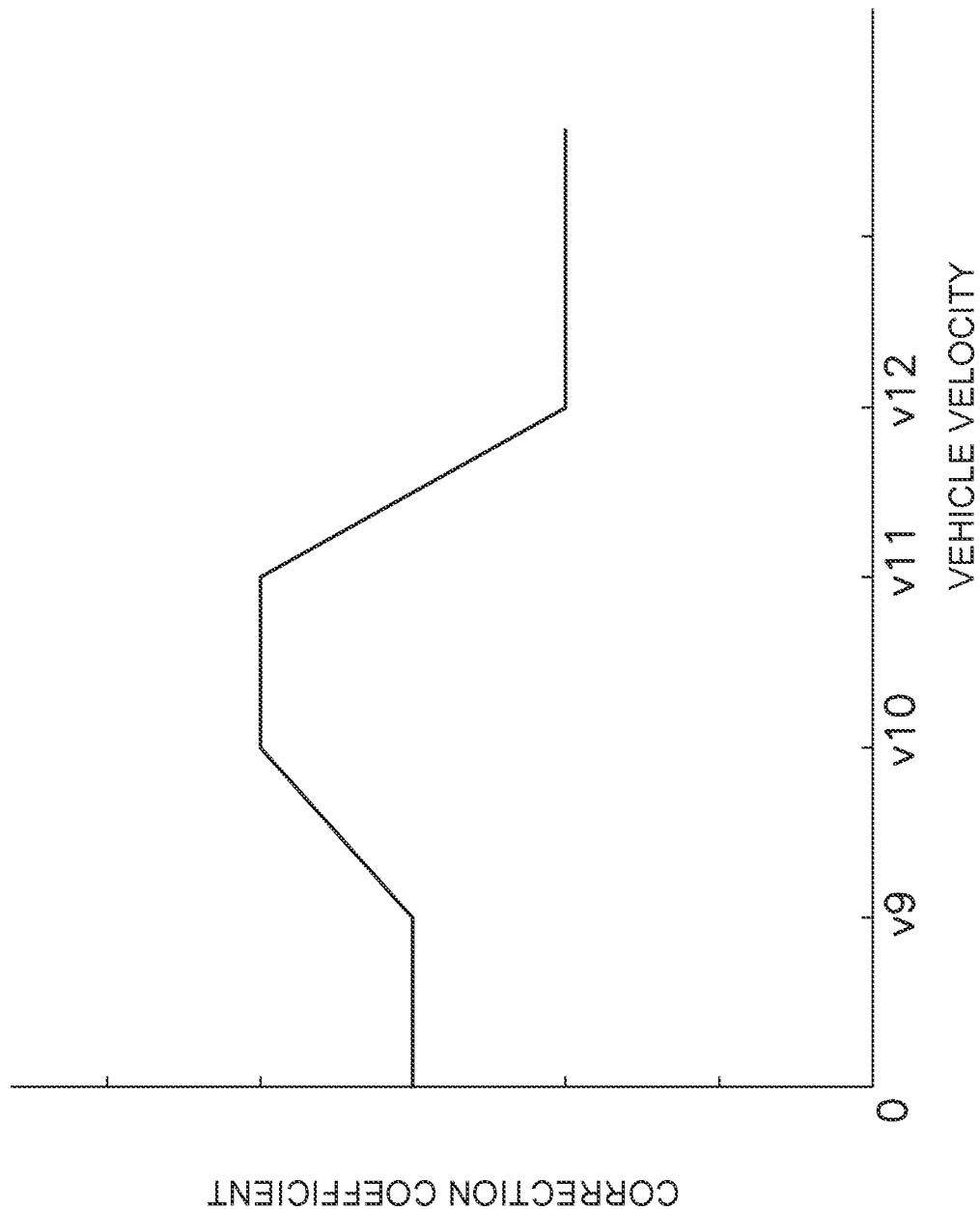
FIG. 9 is a chart showing a relation between vehicle velocity and shaft viscosity resistance correction coefficient.

Speaking in detail, as shown in FIG. 9, when the vehicle velocity of the pallet truck 200 is less than a ninth threshold v9, the power loss calculation section 13 multiplies a sixth correction coefficient β1 with respect to the shaft viscosity resistance kV contained in the formula (4) described above so as to correct the power loss. It is preferable to set the sixth correction coefficient β1 as a fixed value not changing depending on the vehicle velocity. It should be noted that the sixth correction coefficient β1 can increase or decrease depending on the vehicle velocity. Besides, the sixth correction coefficient β1 is, for instance, less than 1.

When the vehicle velocity of the pallet truck 200 is greater than or equal to the ninth threshold v9 and less than a tenth threshold v10, the power loss calculation section 13 multiplies a seventh correction coefficient β2 with respect to the shaft viscosity resistance kV contained in the formula (4) described above so as to correct the power loss. The seventh correction coefficient β2 increases with increase in vehicle velocity. The seventh correction coefficient β2 is greater in rate of change (rate of increase) than the sixth correction coefficient β1. It should be noted that the seventh correction coefficient β2 is, for instance, 1 or less.

When the vehicle velocity of the pallet truck 200 is greater than or equal to the tenth threshold v10 and less than an eleventh threshold v11, the power loss calculation section 13 multiplies an eighth correction coefficient β3 with respect to the shaft viscosity resistance kV contained in the formula (4) described above so as to correct the power loss. It is preferable to set the eighth correction coefficient β3 as a fixed value not changing depending on the vehicle velocity. The eighth correction coefficient β3 is greater in magnitude than the sixth correction coefficient β1. Besides, the eighth correction coefficient β3 can be set to be equal to the maximum value of the seventh correction coefficient β2. The eighth correction coefficient β3 can be set to, for instance, 1. It should be noted that the eighth correction coefficient β3 can increase or decrease depending on the vehicle velocity. In this case, the eighth correction coefficient β3 is lesser in rate of change than the seventh correction coefficient β2.

When the vehicle velocity of the pallet truck 200 is greater than or equal to the eleventh threshold v11 and less than a twelfth threshold v12, the power loss calculation section 13 multiplies a ninth correction coefficient β4 with respect to the shaft viscosity resistance kV contained in the formula (4) described above so as to correct the power loss. The ninth correction coefficient β4 decreases with increase in vehicle velocity. The ninth correction coefficient β4 is greater in rate of change (rate of decrease) than the eighth correction coefficient β3. It should be noted that the ninth correction coefficient β4 is, for instance, 1 or less.

When the vehicle velocity of the pallet truck 200 is greater than or equal to the twelfth threshold v12, the power loss calculation section 13 multiplies a tenth correction coefficient β5 with respect to the shaft viscosity resistance kV contained in the formula (4) described above so as to correct the power loss. It is preferable to set the tenth correction coefficient β5 as a fixed value not changing depending on the vehicle velocity. The tenth correction coefficient β5 is lesser in magnitude than the eighth correction coefficient β3. Besides, the tenth correction coefficient β5 can be equal in magnitude to, greater in magnitude than, or lesser in magnitude than the sixth correction coefficient β1. The tenth correction coefficient β5 can be set to be equal to the minimum value of the ninth correction coefficient β4. The tenth correction coefficient β5 can be set to, for instance, less than 1. It should be noted that the tenth correction coefficient β5 can increase or decrease depending on the vehicle velocity. In this case, the tenth correction coefficient β5 is lesser in rate of change than the ninth correction coefficient β4.

When the present modification (m) is applied simultaneously with the modification (l) described above, the ninth to twelfth thresholds v9 to v12 can be equal to the fifth to eighth thresholds v5 to v8, respectively.

REFERENCE SIGNS LIST

4: Tilt angle detection section
13: Power loss calculation section
14: Rolling resistance calculation section
15: Drive force calculation section
16: Assist force calculation force
17: Current control section
18: Assist force control section
19: Assist limit section
21: Electric motor
22: Motor driver
100: Control device
200: Pallet truck
203: Drive wheel

What is claimed is:

1. A mobile object control device configured to control an electric motor assisting traveling of a mobile object, the mobile object control device comprising:
a rolling resistance calculation section configured to calculate a rolling resistance based on a set weight set by a user;
a power loss calculation section configured to calculate a power loss caused until a power outputted from the electric motor is transmitted to a drive wheel; and
an assist force calculation section configured to calculate an assist force of the electric motor based on an acceleration of the mobile object, the set weight, the rolling resistance calculated by the rolling resistance calculation section, the power loss calculated by the power loss calculation section, and an assist ratio;
wherein the rolling resistance calculation section is configured to multiply a first correction coefficient with respect to the rolling resistance so as to correct the rolling resistance when a vehicle velocity of the mobile object is less than a fifth threshold, the rolling resistance calculation section being further configured to multiply a second correction coefficient with respect to the rolling resistance so as to correct the rolling resistance when the vehicle velocity of the mobile object is greater than or equal to the fifth threshold and less than a sixth threshold, the second correction coefficient increasing with increase in magnitude of the vehicle velocity, and the second correction coefficient is greater in rate of change than the first correction coefficient.

2. The mobile object control device according to claim 1, further comprising:

a drive force calculation section configured to calculate a drive force applied to the mobile object based on the acceleration of the mobile object, the set weight, the rolling resistance calculated by the rolling resistance calculation section, and the power loss calculated by the power loss calculation section, wherein the assist force calculation section is further configured to calculate the assist force of the electric motor based on the drive force calculated by the drive force calculation section and the assist ratio.

3. The mobile object control device according to claim 1, further comprising:

a current control section configured to calculate an electric current flowing through the electric motor based on the assist force.

4. The mobile object control device according to claim 1, wherein the power loss calculation section is further configured to calculate a shaft viscosity resistance based on a vehicle velocity of the mobile object.

5. The mobile object control device according to claim 2, further comprising:

a tilt angle detection section configured to detect a tilt angle of a road surface on which the mobile object travels, wherein the rolling resistance calculation section is further configured to correct the rolling resistance based on the tilt angle detected by the tilt angle detection section, and the drive force calculation section is further configured to correct the drive force based on the tilt angle detected by the tilt angle detection section.

6. The mobile object control device according to claim 1, wherein the rolling resistance calculation section is further configured to correct the rolling resistance when a vehicle velocity of the mobile object becomes a first threshold or greater.

7. The mobile object control device according to claim 1, wherein the power loss calculation section is further configured to correct the power loss when a vehicle velocity of the mobile object becomes a second threshold or greater.

8. The mobile object control device according to claim 1, further comprising:

an assist force control section configured to set the assist force to a preliminarily set value, while causing the assist force calculation section to stop calculating the assist force.

9. The mobile object control device according to claim 8, wherein the assist force control section is further configured to set the assist force to the preliminarily set value, while causing the assist force calculation section to stop calculating the assist force until a vehicle velocity of the mobile object reaches a preliminarily set value from starting of assist control.

10. The mobile object control device according to claim 8, wherein the assist force control section is further configured to set the assist force to the preliminarily set value, while causing the assist force calculation section to stop calculating the assist force until a preliminarily set time elapses from starting of assist control.

11. The mobile object control device according to claim 8, wherein the assist force control section is further configured to set the assist force to zero when the mobile object stands still after elapse of a preliminarily set time.

12. The mobile object control device according to claim 1, further comprising:

an assist limit section configured to execute at least either stopping an assist motion or actuating braking.

13. The mobile object control device according to claim 12, wherein the assist limit section is further configured to execute at least either stopping the assist motion or actuating the braking when it is determined that the acceleration of the mobile object is a third threshold or greater.

14. The mobile object control device according to claim 12, wherein the assist limit section is further configured to execute at least either stopping the assist motion or actuating the braking when it is determined that a vehicle velocity of the mobile object is a fourth threshold or greater.

15. The mobile object control device according to claim 1, wherein the assist force calculation section is further configured to increase the assist force in accordance with an operation by the user.

16. The mobile object control device according to claim 15, wherein the assist force calculation section is further configured to calculate an amount of increase of the assist force based on the set weight and a preliminarily set value of a tilt angle.

17. The mobile object control device according to claim 1, wherein the rolling resistance calculation section is further configured to multiply a third correction coefficient with respect to the rolling resistance so as to correct the rolling resistance when the vehicle velocity of the mobile object is greater than or equal to the sixth threshold and less than a seventh threshold, the third correction coefficient lesser in rate of change than the second correction coefficient.

18. The mobile object control device according to claim 17, wherein the rolling resistance calculation section is further configured to multiply a fourth correction coefficient with respect to the rolling resistance so as to correct the rolling resistance when the vehicle velocity of the mobile object is greater than or equal to the seventh threshold and less than an eighth threshold, the fourth correction coefficient decreasing with increase in magnitude of the vehicle velocity.

19. The mobile object control device according to claim 18, wherein the rolling resistance calculation section is further configured to multiply a fifth correction coefficient with respect to the rolling resistance so as to correct the rolling resistance when the vehicle velocity of the mobile object is the eighth threshold or greater, the fifth correction coefficient lesser in rate of change than the fourth correction coefficient.

20. The mobile object control device according to claim 19, wherein the power loss calculation section is further configured to multiply a sixth correction coefficient with respect to a shaft viscosity resistance so as to correct the power loss when a vehicle velocity of the mobile object is less than a ninth threshold, the power loss calculation section being further configured to multiply a seventh correction coefficient with respect to the shaft viscosity resistance so as to correct the power loss when the vehicle velocity of the mobile object is greater than or equal to the ninth threshold and less than a tenth threshold, the seventh correction coefficient increasing with increase in magnitude of the vehicle velocity, and the seventh correction coefficient is greater in rate of change than the sixth correction coefficient.

21. The mobile object control device according to claim 20, wherein the power loss calculation section is further configured to multiply an eighth correction coefficient with respect to the shaft viscosity resistance so as to correct the power loss when the vehicle velocity of the mobile object is greater than or equal to the tenth threshold and less than an eleventh threshold, the eighth correction coefficient lesser in rate of change than the seventh correction coefficient.

22. The mobile object control device according to claim 21, wherein the power loss calculation section is further configured to multiply a ninth correction coefficient with respect to the shaft viscosity resistance so as to correct the power loss when the vehicle velocity of the mobile object is greater than or equal to the eleventh threshold and less than a twelfth threshold, the ninth correction coefficient decreasing with increase in magnitude of the vehicle velocity.

23. The mobile object control device according to claim 22, wherein the power loss calculation section is further configured to multiply a tenth correction coefficient with respect to the shaft viscosity resistance so as to correct the power loss when the vehicle velocity of the mobile object is the twelfth threshold or greater, the tenth correction coefficient lesser in rate of change than the ninth correction coefficient.

* * * * *